United States Patent
Ogawa et al.

(10) Patent No.: US 7,026,624 B2
(45) Date of Patent: Apr. 11, 2006

(54) RADIATION CONVERTING SUBSTRATE, RADIATION IMAGE PICKUP APPARATUS AND RADIATION IMAGE PICKUP SYSTEM

(75) Inventors: Yoshihiro Ogawa, Tokyo (JP); Kengo Emoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 10/657,224

(22) Filed: Sep. 9, 2003

(65) Prior Publication Data
US 2004/0094719 A1 May 20, 2004

(30) Foreign Application Priority Data
Sep. 11, 2002 (JP) ............... 2002-265572

(51) Int. Cl.
*G01T 1/24* (2006.01)
(52) U.S. Cl. ............... 250/370.11; 250/483.1; 250/484.1; 250/472.1
(58) Field of Classification Search ......... 250/370.11, 250/483.1, 484.4, 472.1
See application file for complete search history.

(56) References Cited

U.S. PATENT DOCUMENTS

| | | | |
|---|---|---|---|
| 5,179,284 A | 1/1993 | Kingsley et al. | 250/370.11 |
| 5,324,609 A * | 6/1994 | Yagi et al. | 430/66 |
| 5,477,053 A * | 12/1995 | Umemoto et al. | 250/483.1 |
| 6,075,256 A | 6/2000 | Kaifu et al. | 257/53 |
| 2002/0017613 A1 | 2/2002 | Homme et al. | 250/370.11 |
| 2003/0025084 A1* | 2/2003 | Honda et al. | 250/370.11 |

FOREIGN PATENT DOCUMENTS

| | | |
|---|---|---|
| JP | 5-196742 | 8/1993 |
| JP | 3066944 | 5/2000 |
| JP | 2000-356679 | 12/2000 |
| WO | WO 98/36290 | 8/1998 |
| WO | WO 00/63722 | 10/2000 |

OTHER PUBLICATIONS

Kato, New Fluorine-Containing Monomer, Sep. 26, 2000, http://www.pcimag.com/CDA/ArticleInformation/features/BNP_Features_Item/0,1846,11368,00.html.*

* cited by examiner

*Primary Examiner*—David Porta
*Assistant Examiner*—Christopher Webb
(74) *Attorney, Agent, or Firm*—Fitzpatrick, Cella, Harper & Scinto

(57) ABSTRACT

The invention is to prevent an interlayer cleavage between a phosphor layer and a moisture-preventing protective layer. In a radiation converting substrate constituted by forming at least a phosphor layer 12 composed of an alkali halide for converting a radiation into light and a light emission activator, and a moisture-preventing protective layer in succession on a radiation-transmitting substrate 11, the moisture-preventing protective layer is constituted of a first plasma polymerization film 13 formed from a monomer of a silane compound, and a second plasma polymerization film 14 formed from a monomer of a fluorine-containing unsaturated hydrocarbon. A radiation image pickup apparatus is formed by adhering such radiation converting substrate and a sensor substrate having a photoelectric converting element.

8 Claims, 2 Drawing Sheets

RADIATION CONVERTING SUBSTRATE, RADIATION IMAGE PICKUP APPARATUS AND RADIATION IMAGE PICKUP SYSTEM

BACKGROUND OF THE INVENTION

1. Field of the Invention

The present invention relates to a radiation converting substrate, a radiation image pickup apparatus and a radiation image pickup system, and more particularly to a radiation converting substrate, a radiation image pickup apparatus and a radiation image pickup system including a phosphor layer for converting a radiation into light and a moisture-preventing protective layer.

2. Related Background Art

In the X-ray diagnosis for transmissive inspection of a human body with X-ray, in place for a conventional X-ray photographic method by a sensitizing screen-film system based on a combination of a sensitizing screen and a film, there has been developed and commercialized a digital X-ray image pickup apparatus based on digital radiography, which is a novel radiation image pickup method utilizing a phosphor and a photoelectric converting member. As a radiation-light converting material to be employed in the digital radiography, there is known a phosphor utilizing an alkali halide. Methods for forming a phosphor on the surface of a photoelectric converting device can be principally classified into following two categories:

(1) a method of directly forming a phosphor by solvent coating or vacuum evaporation, either directly or across a protective layer, on a surface of the photoelectric converting device; and (2) a method of adhering a panel of phosphor with an adhesive material, either directly or across a protective layer, on a surface of the photoelectric converting device.

Such phosphor based on alkali halide is known to be associated with a drawback that alkali halide in a prolonged storage or a prolonged use causes deliquescence by moisture in the air, thereby resulting in a loss in the resolution of the X-ray image.

In the method (1), for example WO98/36290 discloses, in order to prevent deliquescence of the phosphor material, to cover the phosphor material formed on the surface or the photoelectric converting device or the entire surface of a panel of the photoelectric converting device and the phosphor material with a moisture-preventing protective layer. As a material for the moisture-preventing protective layer, there are disclosed polyparaxylilene, a metallic material and a silicone potting material. On the other hand, Japanese Patent Application Laid-open No. 05-196742 discloses to form a thin film layer between a moisture-preventing barrier layer and a phosphor (scintillator). The thin film layer is provided for improving an adhesion between the moisture-preventing barrier layer and the phosphor (scintillator). As a material for the thin film layer, there are disclosed organic materials such as polyparaxylilene, and organopolysiloxane-polycarbonate.

In the method (2), for example Japanese Patent Application Laid-open No. 2000-356679 discloses, in order to prevent deliquescence of the phosphor material, an invention of covering an entire surface of the phosphor panel with a moisture-preventing protective layer. As a material for the moisture-preventing protective layer, there is disclosed a transparent film such as of paraxylilene.

Patent reference 1: WO98/36290;
Patent reference 2: Japanese Patent Application Laid-open No. 05-196742;
Patent reference 3: Japanese Patent Application Laid-open No. 2000-356679.

A digital X-ray image pickup apparatus formed with the aforementioned method (1) by directly forming a phosphor by solvent coating or vacuum evaporation, either directly or across a protective layer, on the surface of the photoelectric converting device and then forming a moisture-preventing protective layer/a light reflecting layer on the surface of the phosphor, is associated with following drawbacks:

Drawback (A): A polyparaxylilene film cannot provide a sufficient moisture barrier property to alkali halide such CsI:Tl, and CsI shows deliquescence in a prolonged storage.

Such drawback (A) occurs similarly also in a digital X-ray image pickup apparatus formed with the aforementioned method (2) by adhering a panel of phosphor with an adhesive material, either directly or across a protective layer, on the surface of the photoelectric converting device and then forming a moisture-preventing protective layer of paraxylilene at least on a surface of the phosphor of the phosphor panel.

In order to solve the drawback (A), it is conceivable, for increasing the moisture preventing effect of the conventionally known moisture-preventing protective layer, to increase a thickness of paraxylilene film. However, an increase in the thickness of the moisture-preventing protective layer results in a new drawback of a proportional loss in a resolution (CTF) of the X-ray pickup image.

Drawback (B): In case of forming a polyparaxylilene film as a moisture preventing film by thermal CVD on a surface of a phosphor composed of an alkali halide such as CsI:Tl and a light emission activator, there cannot be obtained a sufficient adhesion between a surface of the phosphor constituted of alkali halide and the polyparaxylilene film. On the other hand, in case a moisture-preventing protective layer constituted of a thin metal film is formed on the surface of the polyparaxylilene moisture-preventing film for further improving the moisture preventing effect, an interlayer cleavage occurs at an interface between paraxylilene and alkali halide phosphor because of a stress in the metal film. In a part with a defective adhesion, the function of the moisture-preventing protective layer is deteriorated thereby facilitating the deliquescence of the alkali halide phosphor.

SUMMARY OF THE INVENTION

The present invention has been made on the above-described consideration.

An object of the present invention is to provide a moisture-preventing protective layer showing satisfactory adhesion with a phosphor constituted of an alkali halide and a light emission activator.

The present invention has been made on the above-described consideration.

An object of the present invention is to provide a moisture-preventing protective layer showing satisfactory adhesion with a phosphor constituted of an alkali halide and a light emission activator.

A radiation converting substrate of the present invention, constituted by forming a phosphor layer for converting a radiation into light and a moisture-preventing protective layer covering the phosphor layer in succession on a substrate capable of transmitting the radiation, is featured in that the aforementioned moisture-preventing protective layer is constituted of a first plasma polymerization film formed from a monomer of a silane compound, and a second plasma polymerization film formed from a monomer of a fluorine-containing unsaturated hydrocarbon.

A radiation image pickup apparatus of the present invention, constituted by forming a phosphor layer for converting a radiation into light and a moisture-preventing protective layer covering the phosphor layer in succession, either directly or across a protective layer, on a sensor substrate provided with a photoelectric converting element, is featured in that the aforementioned moisture-preventing protective layer is constituted of a first plasma polymerization film formed from a monomer of a silane compound, and a second plasma polymerization film formed from a monomer of a fluorine-containing unsaturated hydrocarbon.

Also the radiation image pickup apparatus of the present invention is formed by adhering a radiation converting substrate of the present invention and a sensor substrate provided with a photoelectric converting element.

A radiation image pickup system of the present invention utilizes the radiation image pickup apparatus of the present invention. In the present specification, in addition to X-ray, electromagnetic waves such as α-ray, β-ray, γ-ray etc. are also included in the radiation.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

In the following, embodiments of the present invention will be explained in detail, with reference to accompanying drawings.

Figure 1:
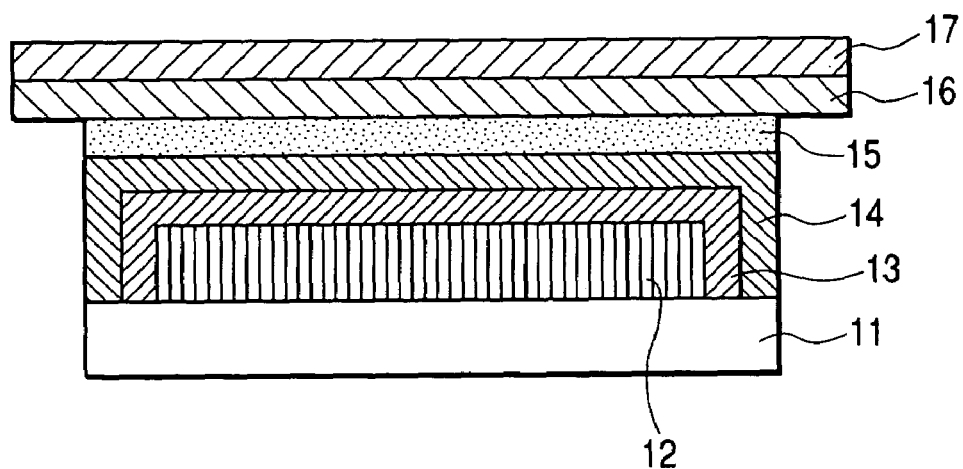
FIG. 1 is a schematic cross-sectional view of a radiation image pickup apparatus formed by adhering a phosphor panel (radiation converting substrate) and a sensor panel (sensor substrate) and constituting a first embodiment of the present invention.

FIG. 1 is a schematic cross-sectional view of a radiation image pickup apparatus formed by adhering a phosphor panel (radiation converting substrate) and a sensor panel (sensor substrate) and constituting a first embodiment of the present invention. On a substrate 11 capable of transmitting X-ray, there is formed a phosphor layer 12 constituted of an alkali halide and a light emission activator. A phosphor panel is constituted by forming a plasma polymerization film 13 of a silane compound and a plasma polymerization film 14 formed from a fluorine-containing unsaturated hydrocarbon monomer in succession so as to cover the surface of the phosphor layer 12. This phosphor panel is adhered, with an adhesive material 15, to a sensor substrate 17 on which a photoelectric converting element 16 to constitute the radiation image pickup apparatus. For the sensor substrate (sensor panel), there can be employed, for example, a sensor substrate bearing a photoelectric converting element and a TFT utilizing amorphous silicon on an insulating substrate such as of glass, as disclosed in Japanese Patent No. 3066944.

The plasma polymerization film 14 formed from a fluorine-containing unsaturated hydrocarbon monomer preferably has a water vapor permeation rate of $10^{-11}$ (g·cm/cm$^2$·cmHg·sec) or less.

The fluorine-containing unsaturated hydrocarbon monomer can be, for example, $C_2F_3H$, $C_2F_2H_2$, $C_2F_3Cl$, $C_2F_2Cl_2$, $CF_3CFCFCF_3$, $CF_2CFCFCF_2$, or $CF_3CCCF_3$. In particular, a fluorine-containing unsaturated hydrocarbon monomer containing hydrogen and fluorine such as $C_2F_3H$ or $C_2F_2H_2$ can further reduce the water vapor permeation rate.

For obtaining a plasma polymerization film 13 with satisfactory adhesion with the phosphor, there can be employed, as a monomer gas, a silane compound such as tetramethoxysilane, dimethyldimethoxysilane, hexamethyldisiloxane or vinyltrimethoxysilane. It is found that, in particular, dimethyldimethoxysilane has an adequate adhesive force both to a phosphor formed by the alkali halide and to a moisture-preventing plasma polymerization film composed of the fluorine-containing unsaturated hydrocarbon. This is presumably because of a fact that a methoxy group of dimethyldimethoxysilane is reactive with an inorganic substance (phosphor) and a methyl group has a high reactivity with an organic substance (moisture-preventing protective layer).

At the surface of the phosphor, a plasma polymerization was conducted by introducing a monomer of a silane compound into a reaction system, thereby forming a first plasma polymerization film 13 of a thickness of 100 to 1000 Angstroms, having an adhesion assisting function. Then a fluorine-containing unsaturated hydrocarbon monomer was introduced into the reaction system to form a second plasma polymerization film 14 as a moisture-preventing protective layer, so as to cover the first plasma polymerization film 13. An interface of the first plasma polymerization film 13 and the second plasma polymerization film 14 constitutes a layer in which both substances are mixed.

The plasma polymerization film is a film formed by the organic monomer, which is excited in a low-temperature plasma and is polymerized into a polymer on the surface of the alkali halide phosphor.

For the phosphor, an alkali halide:activator system can be advantageously employed, and, in addition to CsI:Tl, there can also be employed CsI:Na, NaI:Tl, LiI:Eu, KI:Tl etc.

Figure 2:
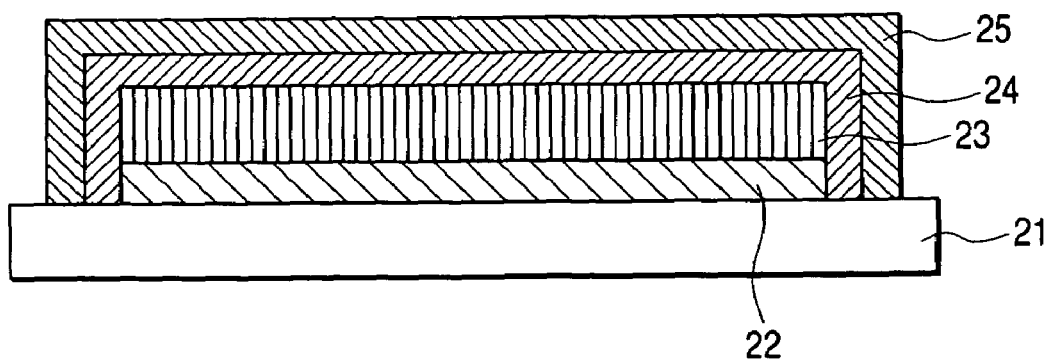
FIG. 2 is a schematic cross-sectional view of a radiation image pickup apparatus constituting a second embodiment of the present invention.

FIG. 2 is a schematic cross-sectional view of a radiation image pickup apparatus of a second embodiment of the present invention. As shown in FIG. 2, the radiation image pickup apparatus of this embodiment is constituted by forming a phosphor layer 23 on a sensor substrate (sensor panel) 21 provided with a photoelectric converting element 22, and further forming thereon a first plasma polymerization film 24 and second plasma polymerization film 25 in succession so as to cover the phosphor layer 23. Materials and producing methods for the sensor substrate (sensor panel), the phosphor layer, the first plasma polymerization film and the second plasma polymerization film are similar to those in the first embodiment.

Also a protective layer may be provided between the sensor substrate and the phosphor layer, in order to prevent an erosion of the photoelectric converting image pickup element by the phosphor layer formed by alkali halide and also to prevent a peeling of the phosphor layer by an incomplete adhesion thereof, and such protective layer can be formed, for example, by SiN, TiO$_2$, LiF, Al$_2$O$_3$, MgO etc., or by polyphenylene sulfide resin, fluorinated resin, polyether ether ketone resin, liquid crystal polymer, polyethernitrile resin, polysulfone resin, polyethersulfone resin, polyallylate resin, polyamidimide resin, polyetherimide resin, polyimide resin, epoxy resin, or silicone resin. There is preferred a resin capable of standing an evaporation temperature at the formation of the phosphor, and a thermal diffusion temperature of the light emission activator. There is also preferred a heat resistance with a thermal deformation temperature of 180° C. or higher.

In the following, there will be explained examples of the present invention.

EXAMPLE 1

On a surface of an amorphous carbon substrate of a thickness of 1 mm, an alkali halide phosphor layer of CsI:Tl was formed by evaporation with a thickness of 450 µm, and was heat treated for 2 hours at 250° C. to activate the light emission activator Tl. Then the substrate, bearing the formed phosphor, was set on an electrode of a plasma polymerization apparatus including parallel plate-shaped electrodes, and was maintained in a vacuum state. Thereafter, a first plasma polymerization film and a second plasma polymerization film were formed under following conditions.
(First Plasma Polymerization Film)
Pressure in the polymerization apparatus: 80 Pa (0.6 Torr)
Monomer gas: dimethyldimethoxysilane
Monomer gas flow rate: 20 SCCM
Power of high frequency power source: 50 W
Discharge time: 5 minutes
(Second Plasma Polymerization Film)
Pressure in the polymerization apparatus: 13.3 Pa (0.1 Torr)
Monomer gas: $C_2F_3H$
Monomer gas flow rate: 50 SCCM
Power of high frequency power source: 50 W
Discharge time: 20 minutes Such formation of the first plasma polymerization film and the second plasma polymerization film provided a moisture-preventing film of a moisture permeation rate of $1.9 \times 10^{-12}$ (g·cm/cm²·cmHg·sec), thereby completing a phosphor panel. The moisture-preventing protective layer had a thickness of 5000 Angstroms (0.5 µm).

This phosphor panel did not show deliquescence of CsI:Tl even after a standing for 100 hours in an atmosphere of a temperature of 40° C. and a humidity of 90%. Also, since the moisture-preventing protective layer was as thin as 0.5 µm, there was not observed a deterioration of CTF, resulting from the moisture-preventing protective layer. A conventional moisture-preventing protective film of paraxylilene required a thickness of 2 to 4 µm for achieving a moisture-preventing function of a level similar to that of the protective film of this example, and showed a deterioration in CTF.

In a conventional example with a moisture-preventing protective layer of a thickness of 2 to 4 µm, a deterioration of CTF (image resolution) was observed in an initial stage.

Also a moisture-preventing protective layer of paraxylilene with a thickness of 0.5 µm showed a deterioration of CTF, in a condition of a standing for 100 hours in an atmosphere of a temperature of 40° C. and a humidity of 90%.

EXAMPLE 2

On a surface of a photoelectric converting element of a sensor panel, prepared by forming the photoelectric converting element on a glass substrate, there was evaporated, across a polyimide protective layer (thickness 5 µm), a pillar-shaped phosphor (pillar diameter: 6–10 µm) composed of CsI:Tl was evaporated with a thickness of 500 µm, and a first plasma polymerization film and a second plasma polymerization film same as in Example 1 were formed with a thickness of 5000 Angstroms. Then a reflective layer of aluminum was formed to complete an X-ray image pickup apparatus.

The X-ray image pickup apparatus did not show deliquescence of CsI:Tl after a standing as in Example 1 for 100 hours in an atmosphere of a temperature of 40° C. and a humidity of 90%.

EXAMPLE 3

A moisture-preventing protective film of a similar effect could be obtained also by changing the monomer gas for the second plasma polymerization film in Example 1 to $CF_2CFCFCF_2$. A first plasma polymerization film and a second plasma polymerization film were prepared under following conditions.
(First Plasma Polymerization Film)
Pressure in the polymerization apparatus: 80 Pa (0.6 Torr)
Monomer gas: dimethyldimethoxysilane
Monomer gas flow rate: 20 SCCM
Power of high frequency power source: 50 W
Discharge time: 5 minutes
(Second Plasma Polymerization Film)
Pressure in the polymerization apparatus: 13.3 Pa (0.1 Torr)
Monomer gas: $CF_2CFCFCF_2$
Monomer gas flow rate: 50 SCCM
Power of high frequency power source: 50 W
Discharge time: 10 minutes The second plasma polymerization film had a thickness of 8000 Angstroms.

EXAMPLE 4

A first plasma polymerization film and a second plasma polymerization film were prepared under following conditions.
(First Plasma Polymerization Film)
Pressure in the polymerization apparatus: 80 Pa (0.6 Torr)
Monomer gas: tetramethoxysilane
Monomer gas flow rate: 20 SCCM
Power of high frequency power source: 50 W
Discharge time: 5 minutes
(Second Plasma Polymerization Film)
Pressure in the polymerization apparatus: 13.3 Pa (0.1 Torr)
Monomer gas: $C_2F_3H$
Monomer gas flow rate: 50 SCCM
Power of high frequency power source: 50 W
Discharge time: 20 minutes Also in this example, there was obtained a moisture-preventing protective layer having an effect similar to that in Example 1.

EXAMPLE 5

A first plasma polymerization film and a second plasma polymerization film were prepared under following conditions.
(First Plasma Polymerization Film)
Pressure in the polymerization apparatus: 80 Pa (0.6 Torr)
Monomer gas: dimethyldimethoxysilane
Monomer gas flow rate: 20 SCCM Power of high frequency power source: 50 W
Discharge time: 5 minutes
  (Second Plasma Polymerization Film)
Pressure in the polymerization apparatus: 13.3 Pa (0.1 Torr)
Monomer gas: $CF_3CCCF_3$
Monomer gas flow rate: 50 SCCM
Power of high frequency power source: 50 W
Discharge time: 8 minutes The second plasma polymerization film had a thickness of about 8000 Angstroms.

Also in this example, there was obtained a moisture-preventing protective layer having an effect similar to that in Example 1.

In the following, there will be explained an application of the foregoing examples to a radiation (X-ray) image pickup apparatus.

Figure 3:
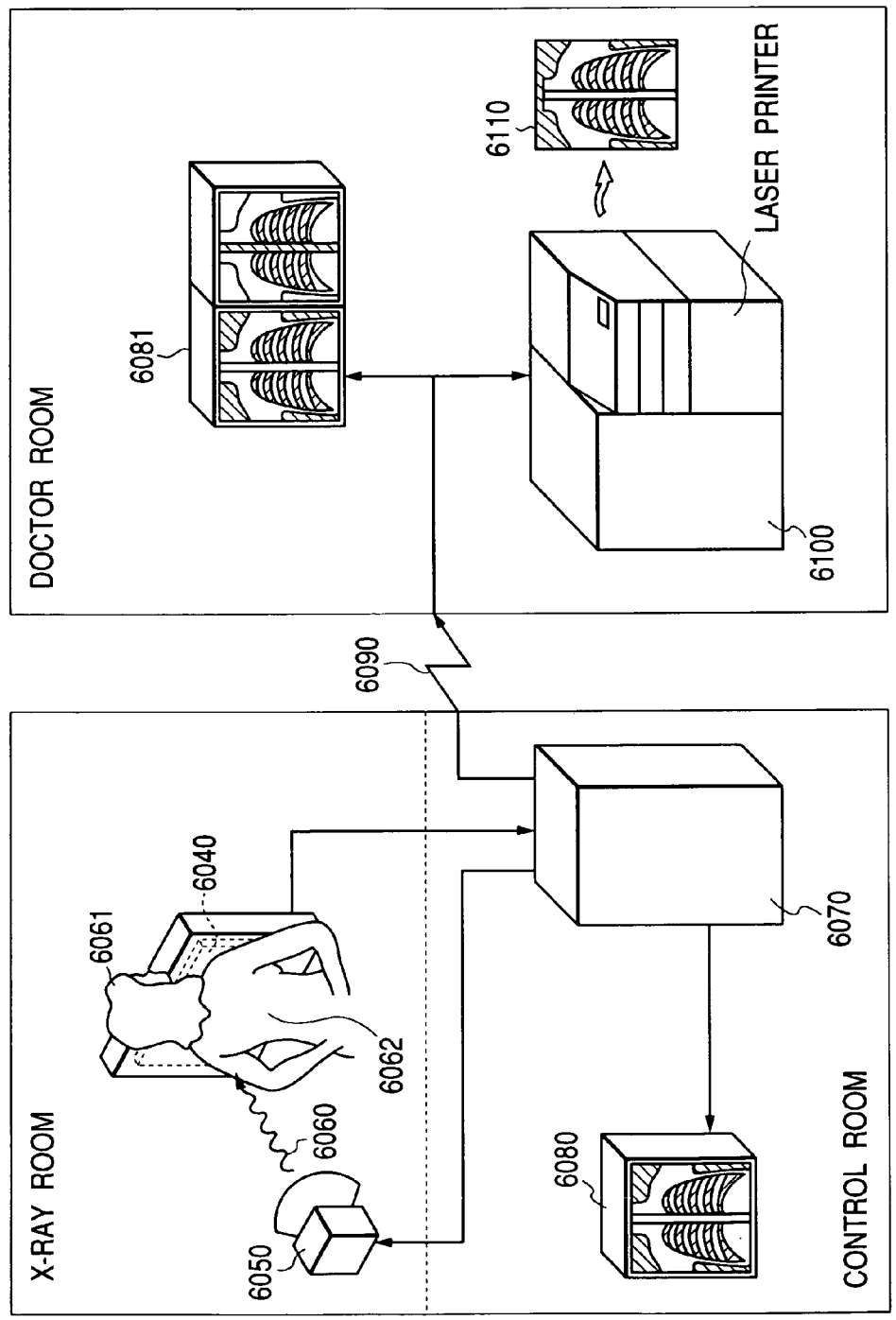
FIG. 3 is a conceptual view showing the configuration of a radiation image pickup system of the present invention.

FIG. 3 shows an example of application of the radiation image pickup apparatus of the present invention to an X-ray diagnostic system.

An X-ray 6060, generated from an X-ray bulb 6050, is transmitted by a chest part 6062 of a patient or an inspection subject 6061, and enters a radiation image pickup apparatus (image sensor) 6040 as shown in FIG. 1 or 2. The incident X-ray contains information of the interior of the body of the patient 6061. In response to the entry of X-ray, a scintillator (phosphor layer) emits light, which is subjected to a photoelectric conversion by a photoelectric converting element of the sensor panel to obtain electrical information. Such information is converted into a digital form, then subjected to an image processing by an image processor 6070 constituting signal processing means, and can be observed on a display 6080 constituting display means in a control room.

Also, this information can be transmitted to a remote location by transmission means such as a telephone line 6090 and can be displayed on a display 6081 constituting display means for example in a doctor room in another location or stored in recording means such as an optical disk, thereby also enabling a diagnosis by a doctor in a distant location. It may also be recorded on a film 6110 by a film processor 6100 constituting recording means.

As explained in the foregoing, the present invention is applicable to an X-ray sensor for medical use, but is also effective in other applications such as a non-destructive testing.

As explained in the foregoing, a moisture-preventing protective film constituted of the plasma polymerization film of the present invention has a superior adhesion to a phosphor, for example composed of alkali halide, in comparison with the already known moisture-preventing protective film of paraxylilene.

Also in a radiation image pickup apparatus constituted by forming a moisture-preventing protective layer on a sensor substrate bearing a photoelectric converting element and a phosphor layer, it was possible to prevent an interlayer cleavage between the phosphor layer and the moisture-preventing protective layer resulting from a difference in thermal expansion of the sensor substrate and the phosphor layer in a storage environment.

As many apparently widely different embodiments of the present invention can be made without departing from the spirit and scope thereof, it is to be understood that the invention is not limited to the specific embodiments thereof except as defined in the claims.

What is claimed is:

1. A radiation converting substrate comprising:
    a substrate capable of transmitting radiation;
    a phosphor layer arranged on said substrate, for converting said radiation into light; and
    a moisture-preventing protective layer covering said phosphor layer,
    wherein said phosphor layer comprises an alkali halide and a light emission activator, and
    wherein said moisture-preventing protective layer comprises a first plasma polymerization film covering said phosphor layer and formed from a monomer of a silane compound, and a second plasma polymerization film covering said first plasma polymerization film and formed from a monomer of a fluorine-containing unsaturated hydrocarbon.

2. A radiation converting substrate according to claim 1, wherein said first plasma polymerization film and said second plasma polymerization film are laminated in succession on said phosphor layer.

3. A radiation converting substrate according to claim 2, wherein said fluorine-containing unsaturated hydrocarbon monomer includes 2 to 5 carbon atoms.

4. A radiation image pickup apparatus formed by adhering a radiation converting substrate according to claim 1 and a sensor substrate including a photoelectric converting element.

5. A radiation image pickup apparatus comprising:
    a sensor substrate provided with a photoelectric converting element;
    a phosphor layer arranged on said sensor substrate, for converting radiation into light; and
    a moisture-preventing protective layer covering said phosphor layer,
    wherein said phosphor layer comprises an alkali halide and a light emission activator, and
    wherein said moisture-preventing protective layer comprises a first plasma polymerization film covering said phosphor layer and formed from a monomer of a silane compound, and a second plasma polymerization film covering said first plasma polymerization film and formed from a monomer of a fluorine-containing unsaturated hydrocarbon.

6. A radiation image pickup apparatus according to claim 5, wherein said first plasma polymerization film and said second plasma polymerization film are laminated in succession on said phosphor layer.

7. A radiation converting substrate according to claim 6, wherein said fluorine-containing unsaturated hydrocarbon monomer includes 2 to 5 carbon atoms.

8. A radiation image pickup system comprising:
    a radiation image pickup apparatus according to claim 5;
    signal processing means which processes a signal from said radiation image pickup apparatus;
    recording means which records a signal from said signal processing means;
    display means which displays a signal from said signal processing means;
    transmission means which transmits a signal from said signal processing means; and
    a radiation source for generating said radiation.

* * * * *